Dec. 29, 1931.  J. R. SOUSA  1,838,460
PARCEL ASSORTING APPARATUS
Filed April 23, 1929  5 Sheets-Sheet 1
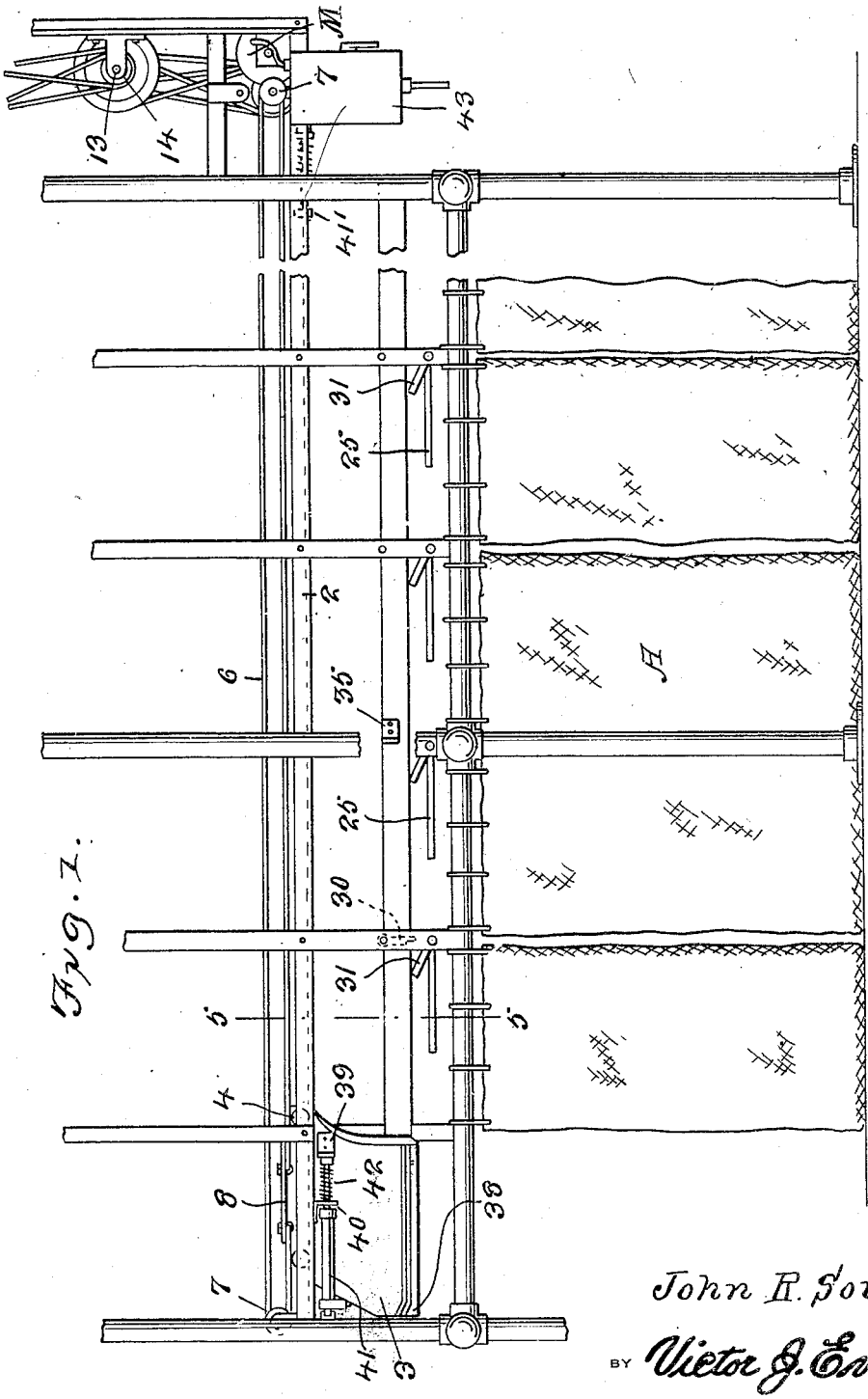
John R. Sousa
INVENTOR
BY Victor J. Evans
ATTORNEY

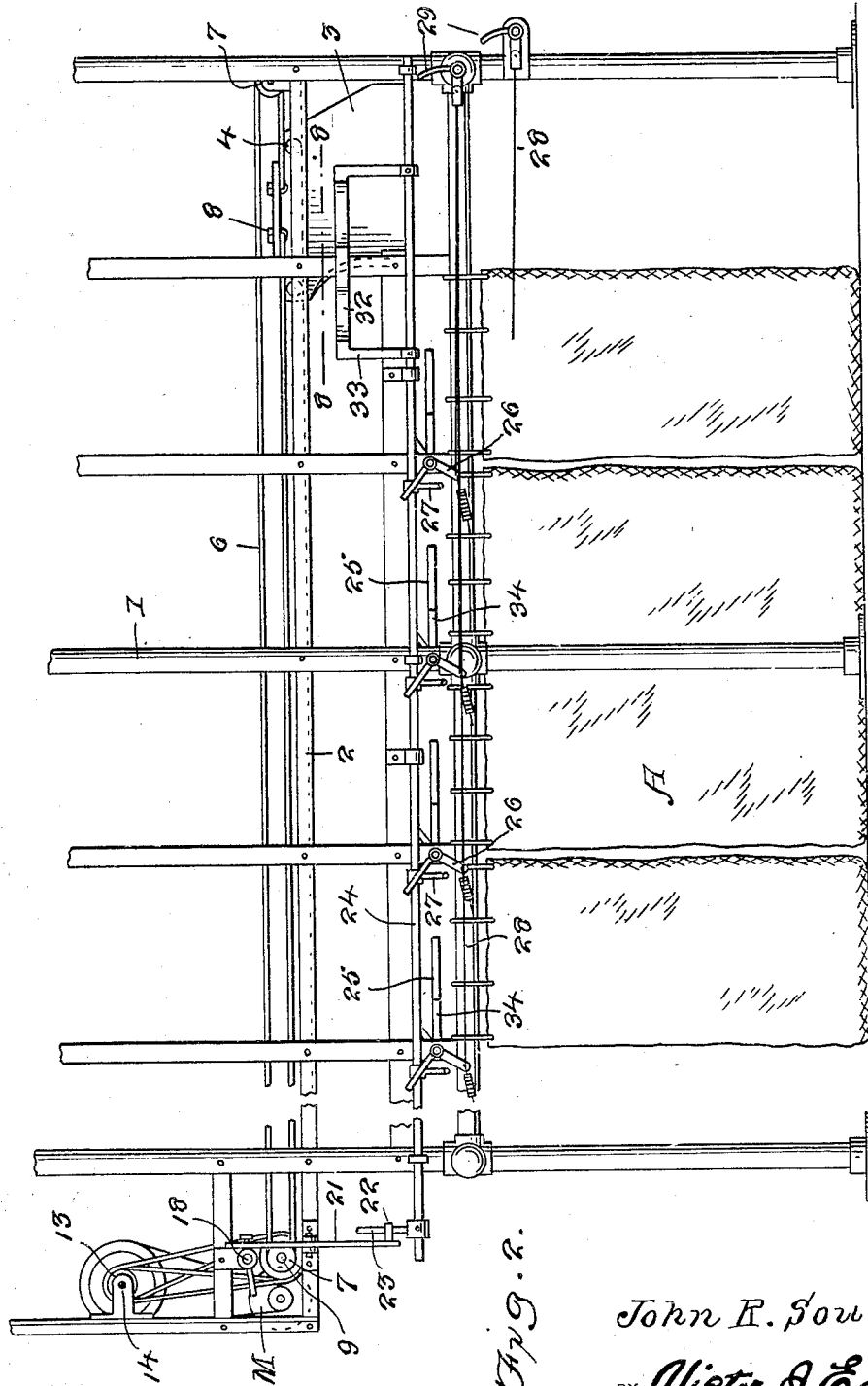

Dec. 29, 1931.  J. R. SOUSA  1,838,460
PARCEL ASSORTING APPARATUS
Filed April 23, 1929   5 Sheets-Sheet 3
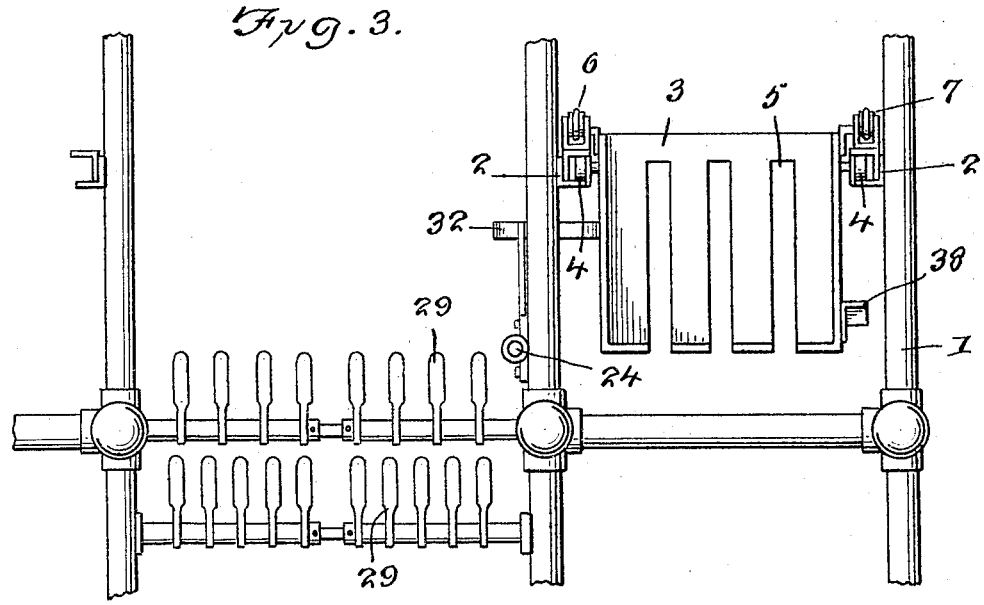
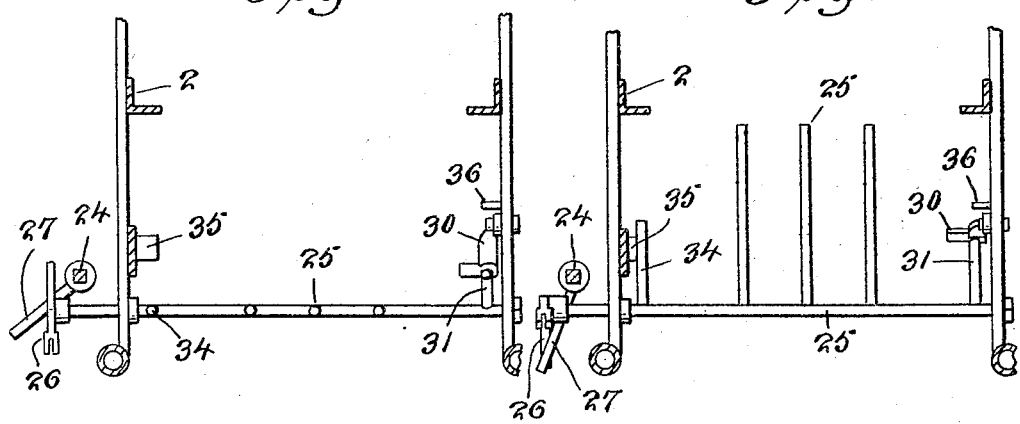
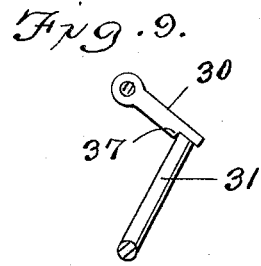
John R. Sousa
INVENTOR
BY Victor J. Evans
ATTORNEY Dec. 29, 1931.    J. R. SOUSA    1,838,460
PARCEL ASSORTING APPARATUS
Filed April 23, 1929    5 Sheets-Sheet 4
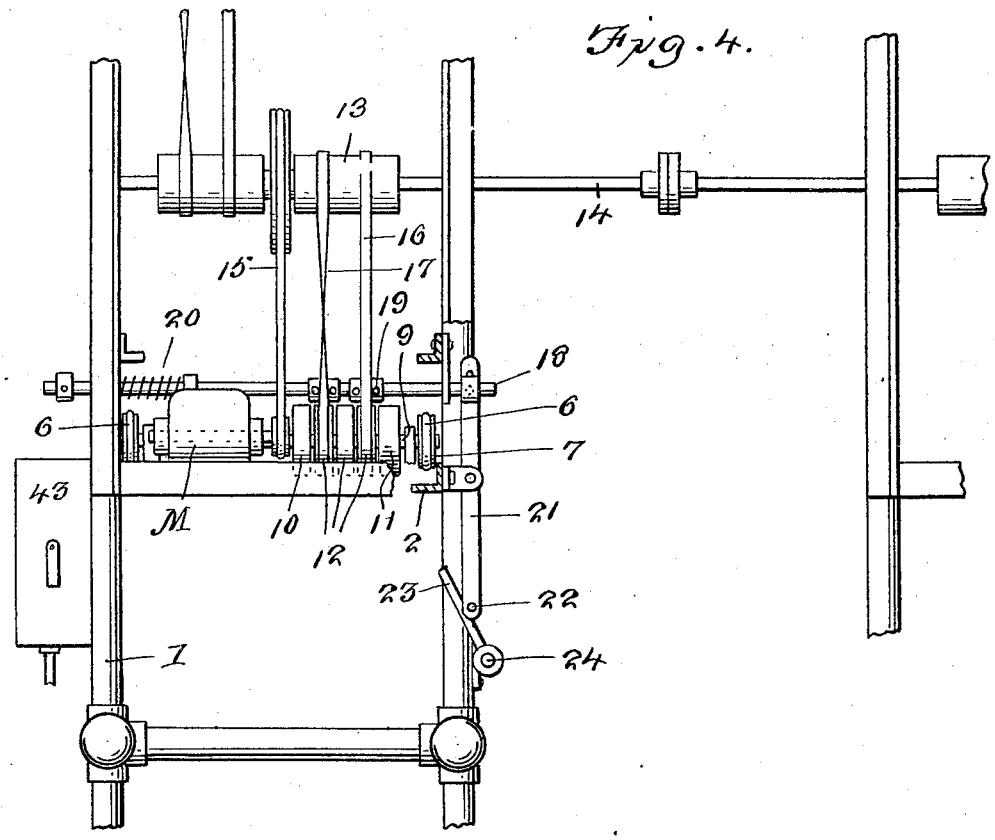
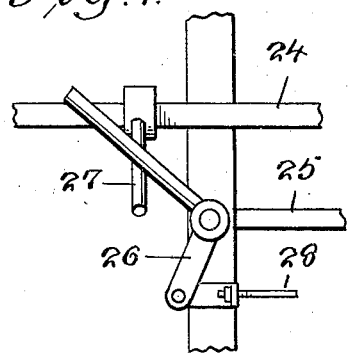
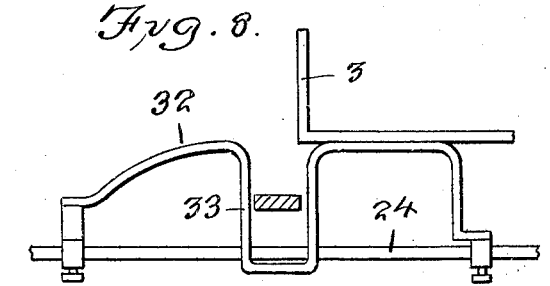
John R. Sousa
INVENTOR
BY Victor J. Evans
ATTORNEY

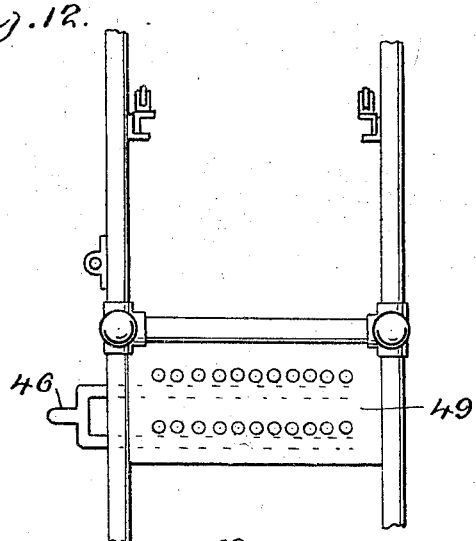
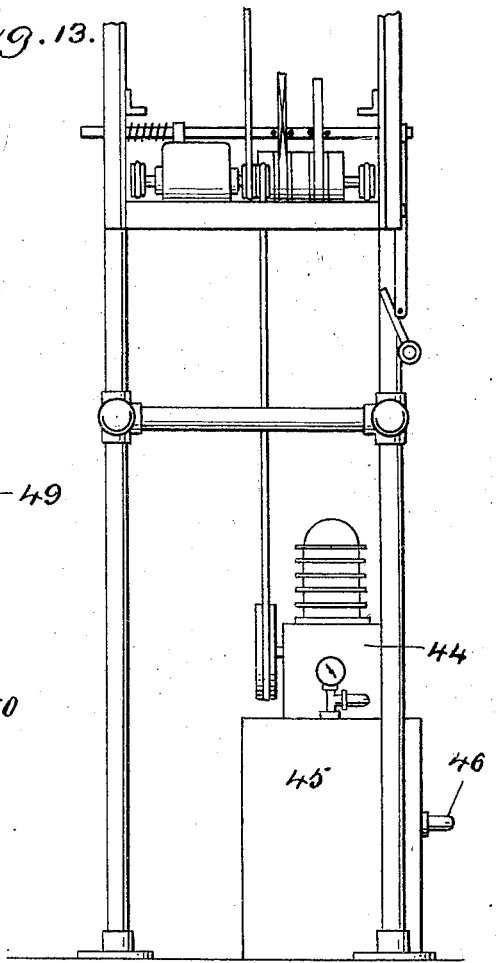
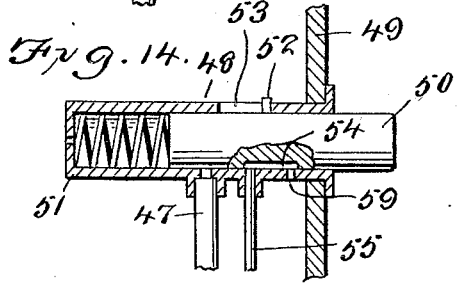
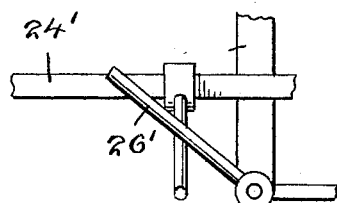
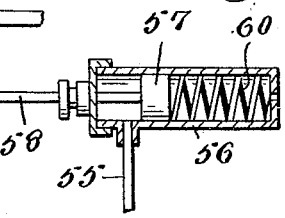

Patented Dec. 29, 1931

1,838,460

UNITED STATES PATENT OFFICE

JOHN R. SOUSA, OF WASHINGTON, DISTRICT OF COLUMBIA

PARCEL ASSORTING APPARATUS

Application filed April 23, 1929. Serial No. 357,571.

This invention relates to a parcel assorting apparatus, the general object of the invention being to provide a carriage operating on a track and a plurality of receptacles placed under the track for receiving articles from the carriage, manually operated rakes for removing the articles or parcels from the carriage and depositing them into the receptacles, a belt driven motor for operating the carriage and means associated with the rake operating means for shifting belt connections between a motor and the belt driving means, whereby the belt will cause the carriage to move rearwardly to deliver a parcel into a receptacle and then return the carriage to its normal position.

Another object of the invention is to provide latch means for holding the rakes in raised position after they have been raised by the manually operated means, with means on the carriage for releasing the latch means as the carriage passes the rake, with spring means for operating the belt shifting means whereby the belt connected with the carriage will be reversed to bring the carriage to neutral position and means operated by the carriage arriving at its neutral or first position to move the belt shifting means to a neutral position.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of the apparatus.

Figure 2 is a view of the opposite side thereof.

Figure 3 is a front end view.

Figure 4 is a rear end view.

Figure 5 is a section on line 5—5 of Figure 1.

Figure 6 is a similar view, but showing the parts in a different position.

Figure 7 is a detail view showing how the manually operated bell crank engages an arm on the belt shifting shaft.

Figure 8 is a section on line 8—8 of Figure 2.

Figure 9 is a detail view showing how an arm on a rake engages the latch member for holding the rake in raised position.

Figure 10 is a view of the latch member.

Figure 11 is a view of the member on the front end of the shaft which is engaged by the carriage to move the belts on the side pulleys, this figure showing the member in its three positions.

Figure 12 is a fragmentary front view showing a modification.

Figure 13 is a rear view of the modified form of the invention.

Figure 14 is a detail view of one of the pushbutton valves of the modification.

Figure 15 is a detail view, partly in section, showing the piston and cylinder arrangement for operating the bell crank by the compressed air.

In these drawings, the numeral 1 indicates an upright frame preferably composed of a plurality of posts arranged in two rows, with cross pieces connecting the posts together, said frame carrying a track 2, preferably consisting of a pair of angle bars, each of which is fastened to a row of the posts. A carriage 3 has its wheels or rolls 4 engaging the track, the carriage comprising a body having its front end open and its rear end closed, with slots 5 formed in said closed end, the slots being extended through the bottom of the carriage.

A pair of cables 6 pass over the supporting pulleys 7 at the ends of the frame, one of these cables being arranged over each rail of the track and the ends of each cable are connected with the carriage, as shown at 8. The pulleys 7 at the rear end of the device are fastened to the ends of a shaft 9, said shaft also carrying a pair of pulleys 10 and 11 and three loose pulleys 12, the loose pulleys being arranged between the fast pulleys. An elongated pulley or drum 13 is carried by a shaft 14 which is driven from a motor M through the belt and pulley shown generally at 15. A straight belt 16 and a cross belt 17 pass over the pulley or drum 13 and these belts are adapted to engage the pulleys 10, 11 and 12, as will be hereinafter described. A belt shifter rod 18 is slidably supported at the rear of the frame and has two pairs of projections 19 thereon, one pair engaging the belt 16 and the other pair the belt 17. A spring 20 on the rod tends to hold the rod in a position with the belt 16 engaging the fast pulley 11 and the belt 17 the central loose pulley 12. A lever 21 is pivoted intermediate its ends to the frame and has its upper end fastened to the rod 18 and a pin 22 is carried by the lower end of the lever. This pin is engaged by an arm 23 on a shaft 24 pivotally supported by one row of the posts so that rocking movement of this shaft 24 will cause the lever to move the shifter rod 18 to shift the belts 16 and 17.

A plurality of rakes 25 is pivotally supported by the frame under the track, each rake having an extending part passing under the shaft 24, with a bell crank 26 on the end of each extending part, one arm of which engages an arm 27 on the shaft. A wire or cable 28 is connected with the lower arm of each bell crank, the other end of each cable being connected to a hand lever 29 arranged adjacent the front of the machine. These parts are so arranged that by manipulating a hand lever, the cable attached thereto will rock the rake, the bell crank of which is attached to the cable so that the rake will be raised, thereby causing its prongs or fingers to be in the path of the carriage so that said fingers will remove an article or parcel from the carriage as the slotted portions of the carriage pass over the fingers. Parcels removed from the carriage by the rakes will drop into sacks A suitably supported by the frame under the rakes. At the same time that the rake is moved to raised position, the upper arm of the bell crank will strike an arm 27 of the shaft 24, thus rocking the shaft and causing its arm 23 to move the lever 21 so that the rod 18 will shift the belt 17 on to the pulley 10 and the belt 16 on to the central pulley 12. Thus the belt 17 will drive the shaft 9 through means of the pulley 10 in a direction to move the carriage toward the rear end of the machine and as the carriage passes the rake which is raised, the article in the carriage will be removed therefrom and dropped into a sack A. As the carriage moves along, it will strike a substantially L-shaped latch 30 pivoted to the frame and engaging a short arm 31 on the rake so that the latch is moved to releasing position and thus the rake will drop into horizontal position. This downward movement of the rake will cause the bell crank to leave the arm 27 on the shaft 24 and thus the arm 23 will move away from the pin 22 on the lever 21 so that the spring 20 will move the belt shifter rod 18 to a position where the belt 16 will engage the fast pulley 11 and the belt 17 engage the central loose pulley 12. The engagement of the belt 16 with the pulley 11 will rotate the shaft 9 in an opposite direction from which it was rotated when the belt 17 engaged the pulley 10 so that the cables 6 will be moved in an opposite direction and thus return the carriage to its starting point at the front end of the apparatus. As the carriage nears its starting point, it will strike the inwardly extending loop portions 32 on a yoke 33, the limbs of which are attached to the shaft 24 and as the carriage strikes the loop portions, it will move the yoke outwardly, thus rocking the shaft 24 and causing the arm 23 to actuate the lever 21 and cause the belt shifter 18 to shift both belts 16 and 17 upon the outer loose pulleys 12 and thus rotary movement of the shaft 9 is ceased.

Each rake is provided with a short arm 34 which will engage a stop 35 on the frame, these parts limiting the movement beyond a vertical position of the rake when pulled upwardly by the actuation of the manually operated means. Upward swinging movement of each latch 30 is limited by a pin 36 carried by the frame. As will be seen, the latch is engaged by the short arm 31 of each rake when the rake is swung upwardly so that the latch is tilted to the position it occupies in Figure 9, and the short arm will engage a shoulder 37 on the latch which holds the parts with the rake in raised position, the arm 34 and the stop 35 limiting the upward movement of the rake and causing the arm 31 to engage the shoulder 37.

The carriage has a flange 38 attached to one side thereof, which acts to strike each latch 30 to move the same to releasing position.

When the carriage nears its neutral position at the front of the machine, a part thereof will strike a head 39 on the piston rod 40 of a piston arranged in the cylinder 41, the rear end of the piston having an adjustable hole therein for checking the escape of air from the cylinder, so that the piston and cylinder act as a shock absorber and a check for the carriage. A spring 42 on the piston rod returns the head 39 to its normal position after the carriage leaves the same.

The switch for the circuit of the motor is arranged in the switch box 43 attached to the rear of the machine.

From the foregoing it will be seen that when an article is to be delivered into a certain one of the sacks A, the operator would manipulate the lever 29 which is attached to the bell crank of the rake above said sack, thereby raising the rake, which is held in raised position by the latch 30 and at the same time causing the shaft 24 and the parts associated therewith to shift the belts from the position they occupy in Figure 4 to a position where the cross belt 17 will engage the pulley 10. Thus the shaft 9 will be rotated in a direction to cause the cable 16 to pull the carriage toward the rear and as the carriage reaches the rake which has been raised, the article in the carriage will be removed by the rake and then the carriage will release the latch so that the rake can drop back to its horizontal position. This dropping of the rake will cause the shaft 24 and its associated parts to permit the spring 20 to operate the belt shifter to a position where the belt 16 will engage the pulley 11 and thus the shaft 9 will be rotated in a direction to move the carriage to its neutral or starting point. As the carriage nears its starting point, it will strike the yoke 33, swinging the same outwardly and thus causing the shaft 24 and its associated parts to shift the belts to the loose pulleys so that the shaft 9 and the cables 6 will cease to move. Thus it will be seen that by manipulating the proper lever 29, an article placed on the carriage can be deposited into any desired sack A and by so moving a lever 29, the carriage moves rearwardly, deposits the article and returns to its starting point without any further action on the part of the operator.

A shock absorber 41' is arranged at the rear end of the track for the carriage, this device being similar to that shown at 41.

In the modification shown in Figures 12 to 15, both inclusive, compressed air is used to operate the bell cranks 26'. The motor operates a compressor 44 which supplies air to a tank 45. A pipe 46 is connected with the tank and has branches 47, each of which is in communication with each one of a plurality of small cylinders 48 carried by a panel 49 at the front of the machine. Each cylinder contains a plunger 50, the front end of which projects from the cylinder and acts as a pushbutton so that the plunger can be pushed inwardly against the action of its spring 51. A pin 52 on the plunger operates in a slot 53 in the cylinder for limiting the movement of the plunger. The plunger is provided with a groove 54 which, when the plunger is pushed inwardly, will connect a branch pipe 47 with a pipe 55 which is connected to a cylinder 56 supported on the frame adjacent each bell crank. A spring pressed piston 57 is arranged in each cylinder 56 and has its rod 58 connected with the lower arm of the bell crank. Thus when a plunger is pressed inwardly, air will flow from the tank 45 through the pipe 46 and one of the branches 47 into the groove 54 and from this groove, the air will pass through the pipe 55 into the cylinder 56, thus forcing the piston 57 forwardly so as to cause the bell crank 26' to operate the shaft 24' so that the belts will be shifted as before described, and the rake to which the bell crank is connected will be raised. When the finger is removed from the plunger 50, the flow of air from the branch 47 will be cut off and the pipe 55 will be placed in communication with a bleed port 59 in the cylinder 48 so that the air will be bled from the cylinder 56 to permit the spring 60 to return the piston 57 to its first position, the spring acting in conjunction with the weight of the rake, when the same is released by the latch to cause the rake to drop.

The drawings show a second frame arranged parallel to the first frame to indicate that a number of these devices can be placed side by side and the drawings also show each frame as extended so that a second assembly can be placed above the assembly shown. The drawings also show the levers and plungers arranged at the front end of the space between the two frames so that they are readily accessible by a person standing at the front of the frames, but it will, of course, be understood that these operating means can be placed wherever desired. The drawings also show how the different assemblies can be driven from the one motor.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A parcel assorting apparatus comprising a frame, a track thereon, a carriage operating on the track, a plurality of rake members for removing articles from the carriage as the carriage moves along the track, a cable connected with the carriage for moving the same on the track, supporting means for the cable, a drive member, shiftable means for driving the cable in either direction from the drive member, manually operated means for raising any desired rake means into operative position, means actuated by the manually operated means for operating the shiftable means to cause the drive member to move the cable in one direction whereby the carriage will be moved along the track until it passes over the raised rake means, latch means for holding the rake in raised position, means on the carriage for releasing the latch means, means for operating the shiftable means to cause the drive member to move the cable in the opposite direction when the rake moves to inactive position, whereby the carriage will be returned to its starting point and means operated by the carriage when the same reaches its starting point for disconnecting the cable from its actuating means.

2. A device of the class described comprising a supporting frame, a track thereon, a carriage movable on the track, a cable for drawing the carriage along the track, pulleys for supporting the cable, a shaft to which one of the pulleys is attached, fast and loose pulleys on the shaft, a pair of belts for engaging the pulleys, one belt being straight and the other crossed, driving means for the belts, a belt shifter for both belts, transfer means arranged at intervals along the track for removing objects from the carriage when such means are in active position, manually operated means for actuating the transfer means and the belt shifter to position the belts so that the carriage is moved rearwardly on the track, means for actuating the shifter after the transfer means have removed an article from the carriage whereby the cable will be moved in a direction to return the carriage to its starting point and means operated by the carriage reaching its starting point for causing the belt shifter to shift the belts to the loose pulleys.

3. A device of the class described comprising a supporting frame, a track thereon, a carriage having its wheels engaging the track, a cable for drawing the carriage along the track, pulleys for supporting the cable, a shaft connected with one pulley, fast and loose pulleys on said shaft, a pair of belts for engaging the said pulleys, a motor driven pulley over which the belts pass, a belt shifter for both belts, one of said belts being straight and the other crossed, spring means on the shifter for holding the straight belt on a fast pulley and the crossed belt on a loose pulley whereby the cable will be moved in a direction to move the carriage to its starting point, a shaft, means operated thereby for moving the belt shifter to a position where the cross belt will engage a fast pulley and the straight belt a loose pulley, whereby the cable will pull the carriage rearwardy, a member at the front end of the shaft and engaged by the carriage when the same reaches its starting point for moving the shaft to a position whereby the belt shifting means will move the belts on to loose pulleys, transfer means arranged at intervals along the track for removing objects from the carriage when such means are in active position, manually operated means for actuating the transfer means, means associated therewith for rocking the shaft to cause the belt shifting means to move the cross belt on to a fast pulley whereby the carriage will be moved rearwardly, the spring on the belt shifter moving the straight belt on to a fast pulley when the transfer means have moved to inactive position whereby the carriage will return to its starting point.

4. A device of the class described comprising a supporting frame, a track thereon, a carriage movable on the track, a cable for drawing the carriage along the track, means including belts and fast and loose pulleys and a belt shifter for moving the cable in opposite directions, transfer means arranged at intervals along the track for removing objects from the carriage when such means are in active position, manually operated means for actuating the transfer means and at the same time the belt shifter whereby the cable will move the carriage rearwardly along the track, means actuated by the carriage passing over the transfer means whereby the transfer means will return to inoperative position, means operating at this point for moving the belt shifter to a position where the cable will be actuated to return the carriage to its starting point, means associated with the belt shifting means and operated by the carriage as the same reaches its starting point for disconnecting the cable from its operating means.

5. A device of the class described comprising a supporting frame, a track thereon, a carriage movable on the track, a cable for drawing the carriage along the track, means including belts and fast and loose pulleys and a belt shifter for moving the cable in opposite directions, transfer means arranged at intervals along the track for removing objects from the carriage when such means are in active position, manually operated means for actuating the transfer means and at the same time the belt shifter whereby the cable will move the carriage rearwardly along the track, means actuated by the carriage passing over the transfer means whereby the transfer means will return to inoperative position, means operating at this point for moving the belt shifter to a position where the cable will be actuated to return the carriage to its starting point, means associated with the belt shifting means and operated by the carriage as the same reaches its starting point for disconnecting the cable from its operating means and a shock absorber for the carriage when the same reaches one limit of its movement, such shock absorber comprising a cylinder, a piston therein, a rod on the piston having a part engaged by the carriage for moving the piston inwardly, a spring for resisting this inward movement of the piston and adjustable air escaping means connected with the cylinder for resisting inward movement of the piston.

6. A device of the class described comprising a supporting frame, a track thereon, a carriage movable on the track, a cable for drawing the carriage along the track, pulleys for supporting the cable, a shaft to which one of the pulleys is attached, fast and loose pulleys on the shaft, a pair of belts for engaging the pulleys, one belt being straight and the other crossed, driving means for the belts, a belt shifter for both belts, transfer means arranged at intervals along the track for removing objects from the carriage when such means are in active position, manually operated means for actuating the transfer means and the belt shifter to position the belts so that the carriage is moved rearwardly on the track, such manually operated means including mechanism operated by compressed air, means for actuating the shifter after the transfer means have removed an article from the carriage whereby the cable will be moved in a direction to return the carriage to its starting point and means operated by the carriage reaching its starting point for causing the belt shifter to shift the belts to the loose pulleys.

In testimony whereof I affix my signature.

JOHN R. SOUSA.